United States Patent
Arbore et al.

(10) Patent No.: US 6,859,283 B2
(45) Date of Patent: Feb. 22, 2005

(54) APPARATUS AND METHOD FOR MEASURING PHASE RESPONSE OF OPTICAL DETECTORS USING MULTIPLE-BEATNOTE OPTICAL HETERODYNE

(75) Inventors: Mark A. Arbore, Los Altos, CA (US); Joseph J Alonis, Palo Alto, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 296 days.

(21) Appl. No.: 10/175,202

(22) Filed: Jun. 17, 2002

(65) Prior Publication Data

US 2003/0231315 A1 Dec. 18, 2003

(51) Int. Cl.[7] .............................................. G01B 9/02
(52) U.S. Cl. .................................... 356/477; 356/484
(58) Field of Search ............................... 356/477, 484, 356/73.1; 250/227.19, 227.27; 385/12

(56) References Cited

U.S. PATENT DOCUMENTS

| | | | |
|---|---|---|---|
| 5,208,819 A | 5/1993 | Huber | 372/32 |
| 5,293,213 A | 3/1994 | Klein et al. | 356/484 |
| 5,745,437 A | 4/1998 | Wachter et al. | 367/100 |
| 5,880,870 A | 3/1999 | Sieben et al. | 359/181 |
| 6,078,833 A | 6/2000 | Hueber | 600/476 |
| 6,424,420 B1 * | 7/2002 | Nakaya | 356/477 |
| 6,493,074 B1 * | 12/2002 | Imamura et al. | 356/73.1 |

FOREIGN PATENT DOCUMENTS

| | | | |
|---|---|---|---|
| EP | 0552415 | 7/1993 | H01S/3/13 |
| WO | 9305554 | 3/1993 | G01B/9/02 |
| WO | 0000783 | 1/2000 | H01S/3/10 |

OTHER PUBLICATIONS

Christian Hentschel et al., *Fiber Optic Test and Measurement*, pp 479–486, 516–517 Prentice Hall PTR, Upper Saddle River, NJ, © 1998, Dennis Derickson, Editor.

* cited by examiner

Primary Examiner—Samuel A. Turner
(74) Attorney, Agent, or Firm—JDI Patent; Joshua D. Isenberg (57) ABSTRACT

A heterodyne modulated optical signal that includes two or more beat notes is produced. A portion of the heterodyne modulated optical signal is coupled to a device under test (DUT). This portion includes modulation at least at two of the beat note frequencies. The output of the DUT includes signals corresponding to two of the beat notes. These signals are mixed to produce a mixed output signal having the same frequency as an additional beat note but a phase that depends on the phase response of the DUT at one or more of the two beat note frequencies. The phase of the mixed output signal is measured with respect to a reference signal having the same frequency and a known phase with respect to the additional beat note. The resulting phase measurement represents the dispersion of the DUT with respect to modulation frequency.

47 Claims, 8 Drawing Sheets

FIG. 1

(PRIOR ART)

FIG. 2A

(PRIOR ART)

FIG. 2B

(PRIOR ART)

APPARATUS AND METHOD FOR MEASURING PHASE RESPONSE OF OPTICAL DETECTORS USING MULTIPLE-BEATNOTE OPTICAL HETERODYNE

FIELD OF THE INVENTION

This invention generally relates to optical heterodyne frequency generation and more particularly this invention relates to measuring phase response of optical components.

BACKGROUND OF THE INVENTION

There are many test applications that require an optical signal to be modulated at a radio or microwave frequency. Such applications include receiver testing, optical-based microwave generation, testing of microwave components, direct optical injection of source signals for high frequency testing (photo-detector on chip) and fiber delivery of microwave signals for remote antennae testing. Recently, optical heterodyne techniques have been developed to modulate optical signals at radio or microwave frequencies. Such techniques typically combine signals from two optical sources, such as lasers, characterized by different frequencies. Due to the superposition principle, the resulting combined signal is characterized by a heterodyne frequency equal to the difference between the two individual laser frequencies. This technique is less expensive than direct modulation using a RF or microwave modulator.

Figure 1:
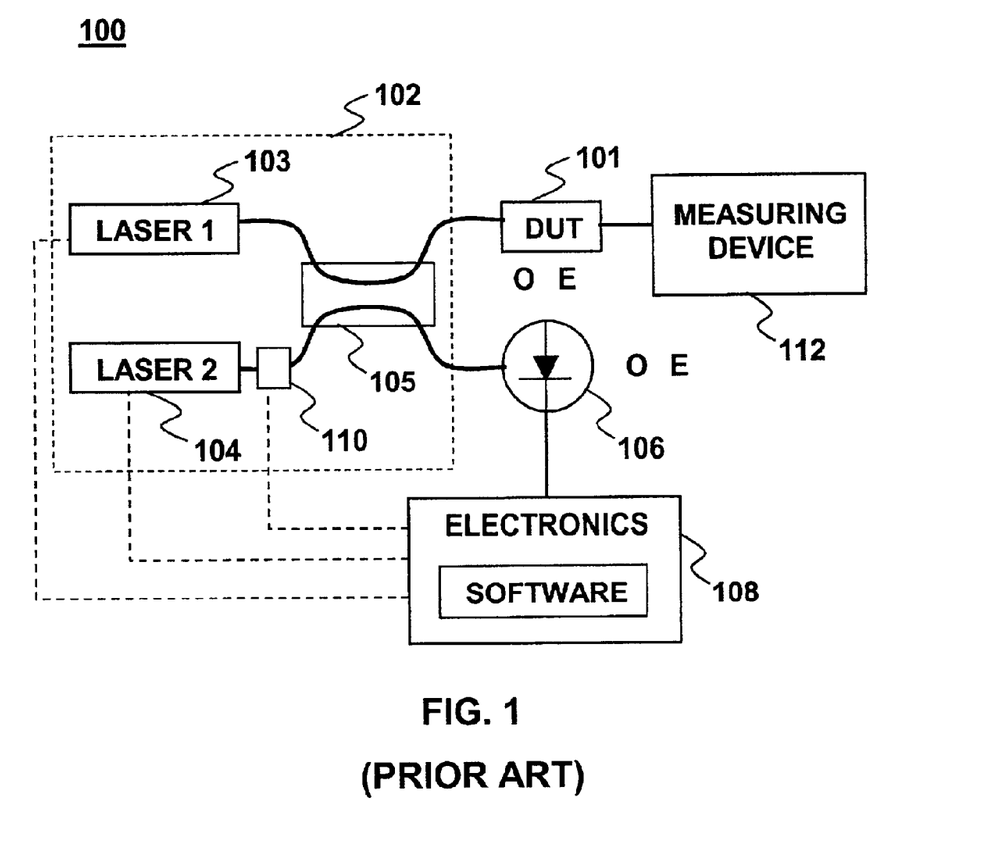
FIG. 1 shows a block diagram of a prior art calibration scheme using optical heterodyne modulation.

FIG. 1 shows a block diagram of a prior art optical heterodyne calibration system 100 used to calibrate a device, known as the device under test (DUT) 101. The DUT produces an electrical signal in response to a modulated optical signal that it receives from a beat note generator 102. In the beat note generator 102 two lasers 103, 104 produce optical signals characterized by slightly different frequencies. A 50:50 coupler 105 combines the signals from the lasers 103, 104 to produce a heterodyne modulated optical signal. One portion of the heterodyne modulated optical signal is coupled to an input of the DUT 101 while another portion is coupled to optical-to-electronic (OE) converter 106. The OE converter 106 produces an electrical signal characterized by the frequency and phase (shifted 180 with the configuration shown in FIG. 1) of the heterodyne modulated optical signal coupled to the DUT 101. The electrical signal is then coupled to an electronics unit 108, which may provide control signals to the lasers 102, 104 and/or an optional variable optical attenuator (VOA) 110 for balancing the power output of the lasers. The DUT 101 produces an output electrical signal that may be coupled to a measuring device 112 such as an RF power meter.

Calibrating optical components often requires measurement of amplitude and phase of the output electrical signal from the DUT 101 relative to the heterodyne modulated optical signal applied to the input of the DUT 101. It is therefore desirable to measure both the amplitude and the phase of the heterodyne modulated optical signal from the coupler. Unfortunately, while it is relatively straightforward to measure the amplitude and phase of a heterodyne signal modulated at frequencies below about 10 Gigahertz (GHz); measuring the phase of such a signal at frequencies above about 10 GHz is problematic.

Figure 2A:
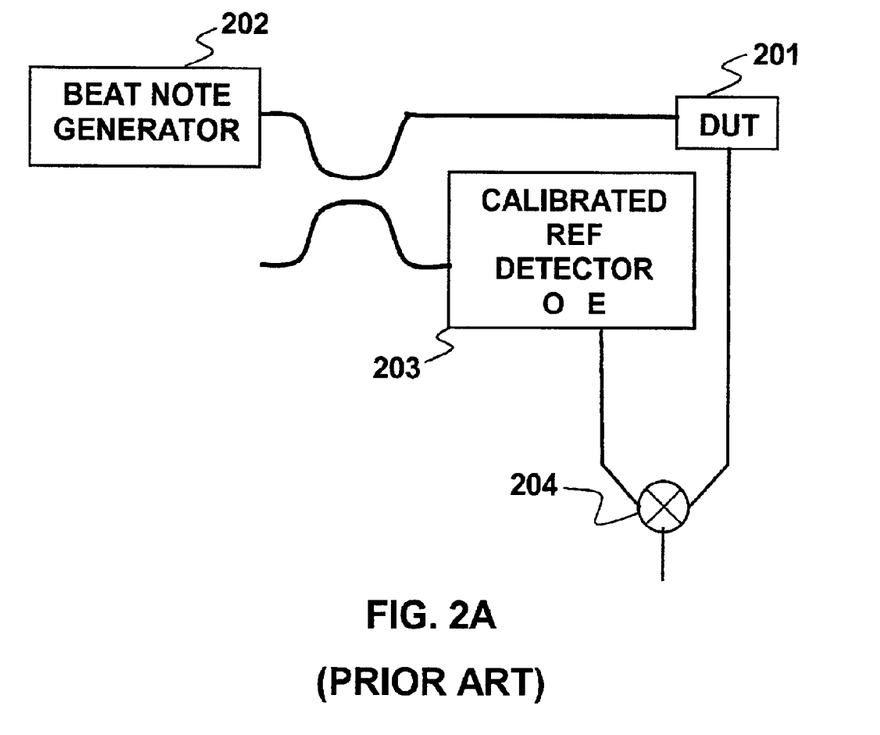
FIG. 2A depicts a block diagram of a first prior art high frequency phase measuring scheme.

For example, FIG. 2A depicts a block diagram of a first prior art high frequency phase measuring scheme. In this scheme a beat note generator 202 produces a heterodyne modulated optical output that is coupled to the input of a DUT 201 and a reference OE detector 203. Electrical outputs from the DUT 201 and the reference OE detector 203 are coupled to a phase detector 204. The drawback of this scheme is that it is both difficult and expensive to calibrate the reference OE detector. Generally for opto-electronic devices, the higher the frequency the more difficult and expensive the calibration.

Figure 2B:
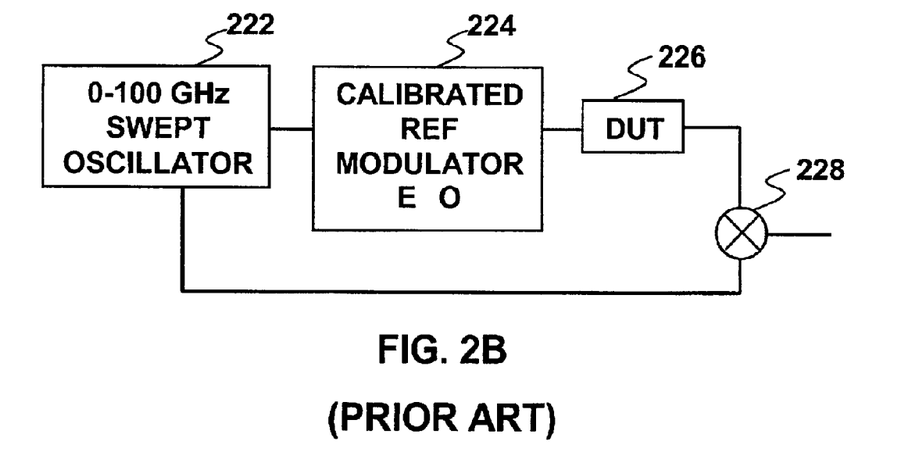
FIG. 2B depicts a block diagram of a second prior art high frequency phase measuring scheme.

FIG. 2B depicts a block diagram of a more standard prior art solution for high frequency phase response measurement. A 0–100 GHz swept oscillator 222 produces both a driving signal and a reference signal. The driving signal drives a calibrated reference electronic-to-optical (EO) converter 224. The reference OE converter 224 produces a modulated optical signal that is coupled to a DUT 226. The output of the DUT 226 and the reference signal from the oscillator 222 are coupled to a phase detector 228. Although such a system is commercially available, the oscillator 222 and the reference EO converter 224 are expensive due to the cost of the high-speed electronics that they contain and the cost of the required calibrations. Systems of the type shown in FIG. 2B can cost approximately $400,000.

Thus, there is a need in the art, for high frequency phase response measurement of opto-electronic devices without incurring the expense associated with high-speed electronics and calibrations of high-speed EO or OE converters.

SUMMARY OF THE INVENTION

Embodiments of the present invention measure phase with a heterodyne modulated optical signal that includes first, second, and third beat notes. At least a portion of this heterodyne modulated optical signal is fed to a device under test (DUT). The portion of the heterodyne modulated optical signal that is coupled to the device under test includes at least modulation at the frequencies of the second and third beat notes. An output of the DUT includes signals corresponding to at least the second and third beat notes. An electrical mixer generates a mixed output signal from the second and third beat notes. A reference signal is produced with the same frequency as and a known phase with respect to the first beat note. A phase difference is then measured between the mixed output signal and the reference signal.

In an alternative embodiment, the heterodyne modulated optical signal may include modulation at least at first and second beat notes. A frequency difference between the first and second beat notes corresponds to an additional beat note. The heterodyne modulated optical signal may or may not include modulation at the frequency of the additional beat note. A reference signal is produced with the same frequency as and a known phase with respect to the first beat note. A phase difference is measured between the mixed output signal and the reference signal.

Embodiments of the present invention may implement phase response characterization and other phase measurements at high input frequencies while reducing reliance on high-speed electronics and substantially eliminating the need for high-speed opto-electronics other than the device under test.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. In the mathematical derivations described below certain assumptions have been made for the sake of clarity. These assumptions should not be construed as limitations on the invention. Accordingly, the exemplary embodiments of the invention described below are set forth without any loss of generality to, and without imposing limitations upon, the claimed invention.

Figures 3A, 3B:
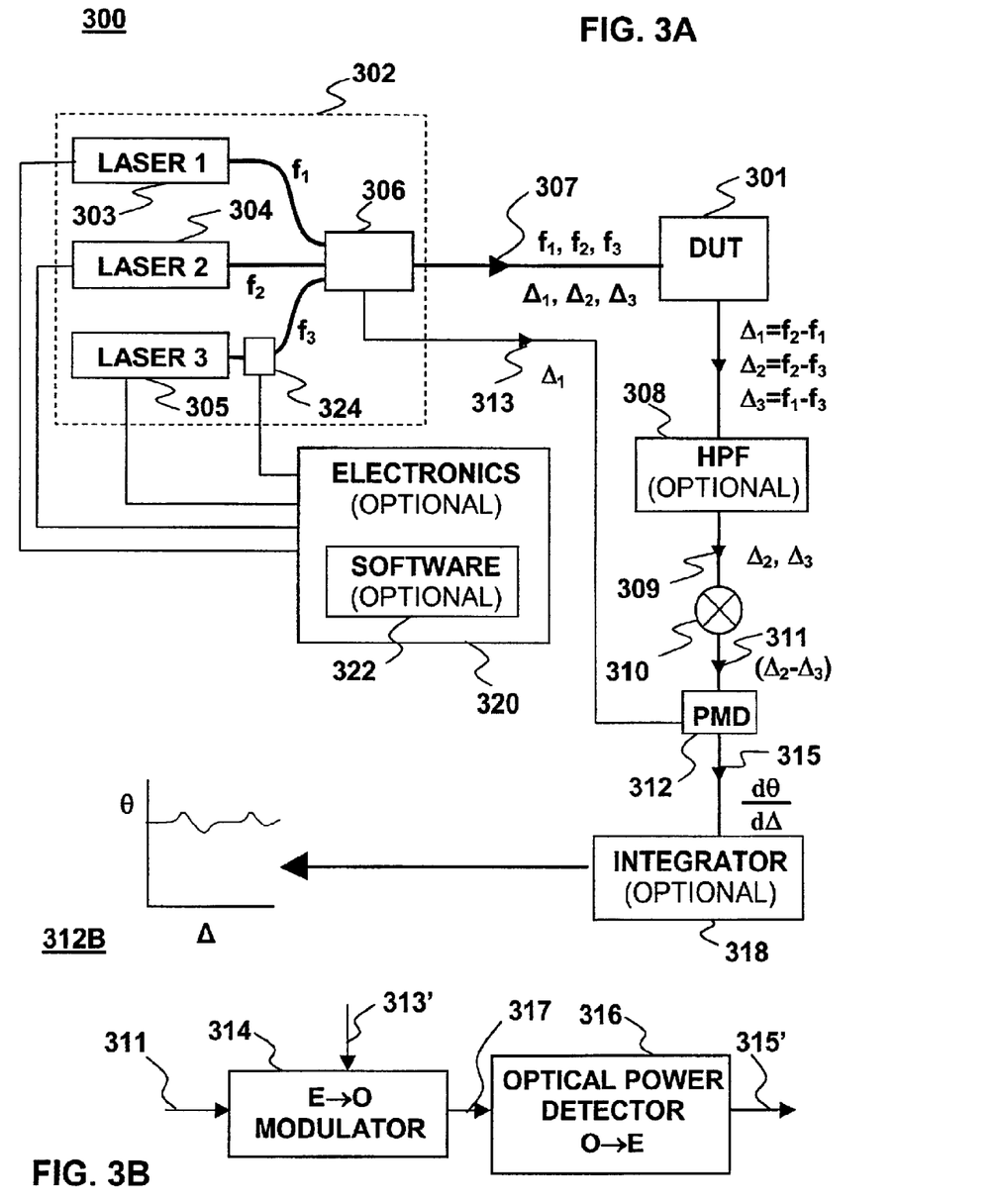
FIG. 3A depicts a block diagram of a phase measuring apparatus according to an embodiment of the present invention.
FIG. 3B depicts a block diagram of an alternative mixer that may be used in conjunction with the phase measuring apparatus of FIG. 3A.
Figure 4:
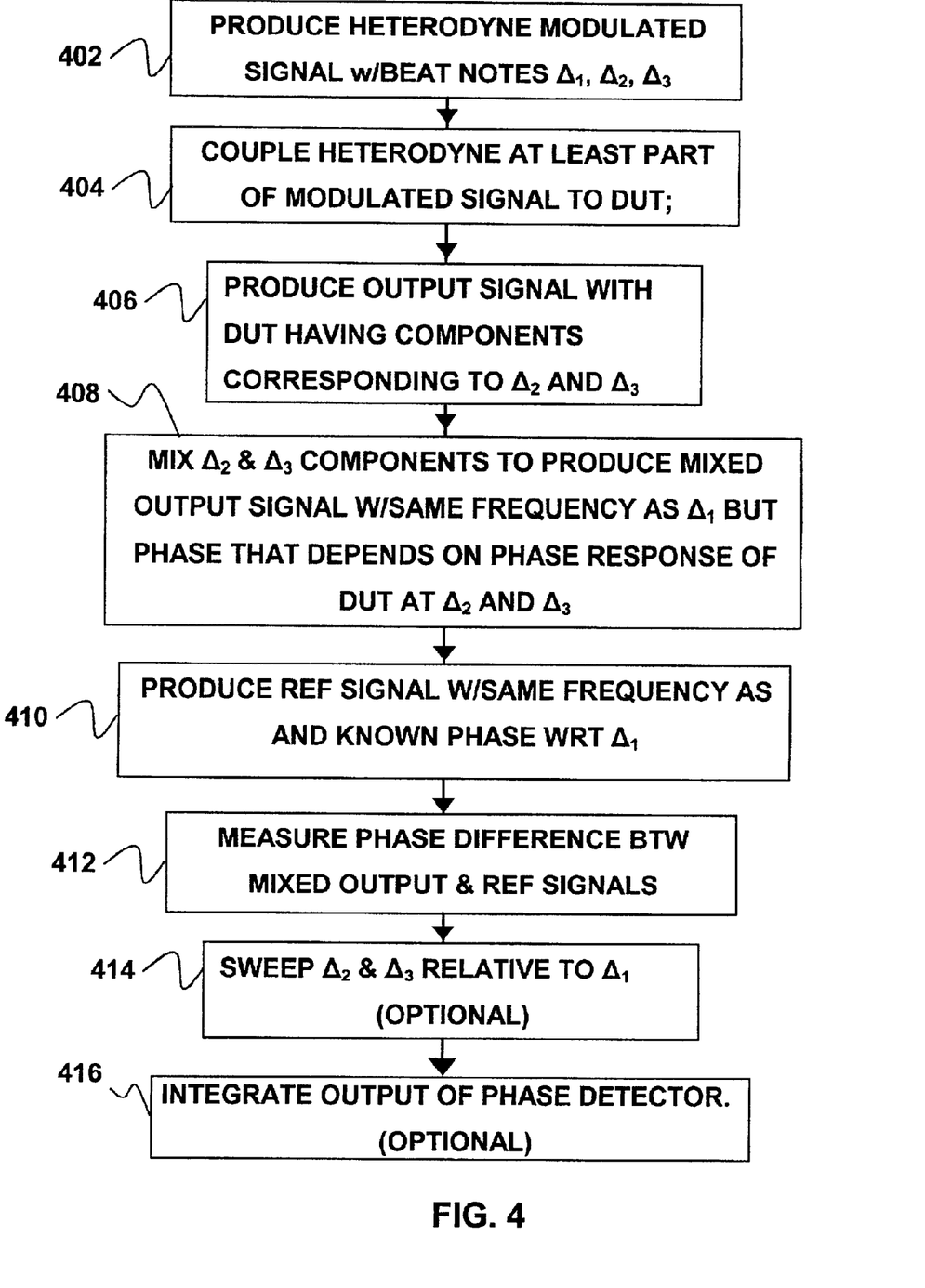
FIG. 4 depicts a flow diagram illustrating a phase measurement method according to an embodiment of the present invention.

Methods and apparatus for measuring phase according to an embodiment of the present invention may be understood by referring to FIG. 3A and FIG. 4. FIG. 3A depicts a block diagram of a phase measuring apparatus 300 for measuring the effect of a device under test (DUT) 301 on the phase of a signal. In general, the DUT 301 is a device that receives a modulated optical input and produces a corresponding electrical output signal having a phase relative to a phase of the modulated optical input. The phase of the output signal depends in some way on the characteristics of the DUT. The DUT 301 may be regarded as a workpiece upon which the phase measuring apparatus 300 operates.

The phase measuring apparatus 300 generally includes a heterodyne source 302 that produces a heterodyne modulated optical signal 307 that is coupled to the DUT 301. The heterodyne optical signal 307 is characterized by at least three different beat note signals characterized by different beat note frequencies $\Delta_1$, $\Delta_2$, $\Delta_3$. The output of the DUT 301 is coupled to a high-speed mixer 310, which is coupled to a phase measuring device (PMD) 312. The PMD 312 may be coupled to an integrator 318.

As used herein, low-speed electronics refers to electronics capable of processing (e.g., mixing, filtering, amplifying) signals having frequencies between 0 and about 10 gigahertz (GHZ). High-speed electronics as used herein, refers to electronics that are capable of processing signals having frequencies greater than 10 Gigahertz.

The operation of embodiments of the inventive phase measurement method in general, and the phase measurement apparatus 300 in particular is best understood by referring simultaneously to FIG. 3A and the flow diagram of FIG. 4. Referring first to the flow diagram, the method begins at 402 by producing the heterodyne modulated optical signal 307 characterized by at least three different beat notes. The heterodyne modulated optical signal 307 includes at least three different beat note signals characterized by different beat note frequencies $\Delta_1$, $\Delta_2$, $\Delta_3$. Preferably, at least one of the three beat notes has a frequency that low enough to be processed by low frequency electronics, e.g., in the PMD 312. Furthermore, the frequency of say the first beat note is equal to a difference between the frequencies of the second and third beat notes, e.g., $\Delta_1 = \Delta_2 - \Delta_3$. Alternatively, the frequency of any beat note is the sum or difference of the other two. In the example depicted in FIG. 3A, the heterodyne source includes three lasers 303, 304, and 305 that are optically coupled to a combiner 306. The frequencies of the three signals produced by the three lasers may be suitably adjusted so that the output of the combiner 306 produces the desired heterodyne modulated optical signal 307. An output of the combiner 306 may be optically connected to the DUT 301 to couple the heterodyne output 307 to an input of the DUT 301. Optical connections within phase measuring apparatus 300 and/or between the apparatus 300 and the DUT 301 may be implemented, e.g., using fiber. Alternatively, such optical connections may be implemented in free space or with optical waveguides.

The lasers 303, 304, 305 may be distributed feedback (DFB) lasers, such as a model D2525P distributed feedback laser modules from Lucent Technologies of Murray Hill, N.J. Alternatively, Model A1915L DFB laser modules from Alcatel of Paris, France may be used. Alternatively a coherent light source with a spectral bandwidth sufficiently less than the lowest beat note frequency may be used. The heterodyne source 302 may be operable under the control of suitable electronics 320 coupled to the lasers 303, 304, 305 and one or more optional variable optical attenuators 324 coupled between the lasers and the combiner 306. Although, for the sake of clarity, a single optical attenuator is shown in the example depicted in FIG. 3A, two or more optical attenuators 324 may be used to attenuate the signals of two or more of the lasers 303, 304, 305.

To produce the heterodyne output 307 the lasers 303, 304, 305 are respectively tuned to slightly different frequencies $f_1$, $f_2$, $f_3$. For the sake of the discussion that follows, the electric field $E_H$ of the heterodyne modulated optical signal 307 may be represented mathematically by:

$$E_H = \sin(f_1 t + \phi_1) + \sin(f_2 t + \phi_2) + \sin(f_3 t + \phi_3), \tag{1}$$

where t is time and $\phi_1$, $\phi_2$, $\phi_3$ are optical phases corresponding to the three optical frequencies $f_1$, $f_2$, $f_3$. For the sake of simplicity it is assumed that the fields from the three lasers are normalized such that the optical powers represented by those fields are equal.

By way of numerical example, and without loss of generality, the frequencies may be as follows:

$$f_1 = 51 \text{ GHz} + f_0 \quad (2)$$

$$f_2 = 50 \text{ GHz} + f_0 \quad (3)$$

$$f_3 = 0 \text{ GHz} + f_0 \quad (4)$$

where $f_0$ represents some optical frequency, e.g., in the range of roughly 100–1000 Terahertz (THz). In a preferred embodiment $f_0$ is approximately 200 THz.

When the outputs from the three lasers are combined in the combiner 306, by virtue of the superposition principle the resulting heterodyne optical output 307 is characterized by three beat notes $\Delta_1$, $\Delta_2$, and $\Delta_3$, which may be defined as follows:

$$\Delta_1 = f_1 - f_2 = 1 \text{ GHz} \quad (5)$$

$$\Delta_2 = f_2 - f_3 = 50 \text{ GHz} \quad (6)$$

$$\Delta_3 = f_1 - f_3 = 51 \text{ GHz} \quad (7)$$

Furthermore, from the above equations $\Delta_1$, $\Delta_2$, and $\Delta_3$ are related to each other as follows:

$$|\Delta_2 - \Delta_3| = |(f_2 - f_3) - (f_1 - f_3)| = |f_2 - f_1| = |-\Delta_1| = |\Delta_1| \quad (8)$$

The frequencies listed above provide one example among many possible examples. More generally, the lower limit of the frequency of the first beat note $\Delta_1$ is limited by the laser line width of the lasers that produce $f_1$ and $f_2$. The upper limit of the frequency of the first beat note $\Delta_1$ typically depends on two considerations. The first is that it is desirable for the first beat note to have a frequency within a range for which the phase response of the DUT 301 is substantially flat and/or known or knowable. The second consideration is that the frequency of the first beat note $\Delta_1$ sets limits on the phase response measurement. For example, the value of $\Delta_1$ determines the lowest frequency that can be measured. In addition, the larger the value of $\Delta_1$ the better the sensitivity of the apparatus 300 and the smaller the value of $\Delta_1$, the better the resolution. As a numerical example, the first beat note may have a frequency $\Delta_1$ of between about 10 MHz and about 10 GHz. The second and third beat notes $\Delta_2$, $\Delta_3$ generally both have frequency values that are much greater than that of the first beat note $\Delta_1$. The upper limit on the values for $\Delta_2$ and $\Delta_3$ depends on the tuning range of the lasers 303, 304, 305. As a numerical example the second and third beat notes $\Delta_2$, $\Delta_3$ may have frequency values of between about 100 MHz and about 500 GHz, depending on the value of $\Delta_1$. From equation 8, $\Delta_2$ and $\Delta_3$ will be such that the absolute value of the difference between $\Delta_2$ and $\Delta_3$ is equal to $\Delta_1$, i.e. $|\Delta_2 - \Delta_3| = \Delta_1$.

Referring again to the flow diagram, at 404 the heterodyne modulated optical signal is coupled to the device under test (DUT) 301. An optical detector, like the DUT 301 typically measures optical power P and not the electric field $E_H$. It is assumed that the DUT does not respond to optical frequencies, but does respond to modulation of optical signals at the frequencies of the three beat notes $\Delta_1$, $\Delta_2$, and $\Delta_3$. For the sake of simplicity, it is assumed that power P and electric field $E_H$ in the heterodyne optical signal 307 are normalized such that, when averaged over many cycles, $P = E_H^2$. Thus $$P = \sin^2(f_1 t + \phi_1) + \sin^2(f_2 t + \phi_2) + \sin^2(f_3 t + \phi_3) + 2\sin(f_1 t + \phi_1)\sin(f_2 t + \phi_2) + 2\sin(f_2 t + \phi_2)\sin(f_3 t + \phi_3) + 2\sin(f_1 t + \phi_1)\sin(f_3 t + \phi_3). \quad (9)$$

When averaged over many cycles, the first three terms each average to ½. Furthermore, through the use of appropriate trigonometric identities it may be shown that the last three terms in the power P depend on the beat note frequencies $\Delta_1$, $\Delta_2$, $\Delta_3$ and their respective relative phases $\delta_1$, $\delta_2$, $\delta_3$ defined as:

$$\delta_1 = \phi_1 - \phi_2 \quad (10)$$

$$\delta_1 = \phi_2 - \phi_3 \quad (11)$$

$$\delta_3 = \phi_1 - \phi_2 \quad (12)$$

so the power P can be rewritten as:

$$P = 3/2 + \sin(\Delta_1 t + \delta_1) + \sin((f_1 + f_2)t + (\delta_1 + \delta_2)) + \sin(\Delta_2 t + \delta_2) + \sin((f_2 + f_3)t + (\delta_2 + \delta_3)) + \sin(\Delta_3 t + \delta_3) + \sin((f_1 + f_3)t + (\delta_1 + \delta_3)) \quad (13)$$

Over many optical cycles the sine terms involving frequency sums average out to zero. Thus, the above equation may be simplified as:

$$P = 3/2 + \sin(\Delta_1 t + \delta_1) + \sin(\Delta_2 t + \delta_2) + \sin(\Delta_3 t + \delta_3) \quad (14)$$

which represents the power of the optical heterodyne signal 307.

At 406, the DUT 301 produces an electrical output signal 309. It is assumed that the DUT 301 has a frequency response that may be characterized by an amplitude response $R(\Delta)$ and a phase response $\theta(\Delta)$ of the electrical output 309 with respect to an optical input signal, such as the heterodyne optical signal 307. It is assumed, for the sake of clarity of the following discussion that $R(0)=1$ in the appropriate units for power and voltage. Thus, the electrical output 309 may be given by:

$$V_{OUT\text{-}DUT} = 3/2 + R(\Delta_1)\sin(\Delta_1 t + \delta_1 + \theta(\Delta_1)) + R(\Delta_2)\square\sin(\Delta_2 t + \delta_2 + \theta(\Delta_2)) + R(\Delta_3)\sin(\Delta_3 t + \delta_3 + \theta(\Delta_3)) \quad (15)$$

The output signal 309 includes at least first and second components $\Delta_2'$, $\Delta_3'$ respectively corresponding to the second and third beat notes $\Delta_2$ and $\Delta_3$. The first and second components $\Delta_2'$, $\Delta_3'$ of the output signal 309 include information about the phase response of the DUT 301 at the frequencies of the second and third beat notes $\Delta_2$, $\Delta_3$. As a practical matter, the output signal 309 may also include a third component $\Delta_1'$ corresponding to the first beat note $\Delta_1$. However, if the first beat note $\Delta_1$ has a sufficiently low frequency the DUT 301 will have either a negligible effect on the phase of first beat note $\Delta_1$ or any such effect can be measured using low-speed electronics and/or low-speed opto-electronics. Furthermore, modulation at the frequency of the first beat note $\Delta_1$ may be removed from the optical heterodyne signal 307 before it reaches the DUT 301. In some embodiments it may be desirable to filter out the third component $\Delta_1'$ from the output signal 309. To this end, a suitably configured high pass filter (HPF) 308 may optionally be coupled between the DUT 301 and the high-speed mixer 310.

Referring again to FIG. 4 at 408 the first and second components $\Delta_2'$, $\Delta_3'$ are mixed together to produce a mixed output signal 311, which may be characterized by voltage $V_{MIX\text{-}OUT}$. In the example depicted in FIG. 3A, the output signal 309 is coupled to the high-speed mixer 310 to produce the desired mixed output 311. In a specific example, a WM-series single ended mixer, (e.g., WM-3, 4, 5, 6, 8 or 10 depending on the frequency range for $\Delta_2$, $\Delta_3$) from Farran Technology of Ballincollig, Ireland or an appropriate ZBM series balanced mixer from ZAX Millimeter Wave Corporation of San Dimas, Calif. may be used the high-speed mixer 310.

The high-speed mixer 310 may also be characterized by an amplitude response and a phase response. These may be ignored for the sake of simplicity in the present derivation. If necessary, the amplitude and phase response of the high-speed mixer 310 may be measured using techniques well known in the art and their effect may be taken into account. The mixer 310 produces an electrical $V_{MIX\text{-}OUT}$, which may be represented as the square of its input signal $V_{MIX\text{-}IN}$. Since $V_{OUT\text{-}DUT} = V_{MIX\text{-}IN}$ in the present example the output signal $V_{MIX\text{-}OUT}$ from the high-speed mixer 310 may be written as:

$$V_{MIX\text{-}OUT} = (V_{OUT\text{-}DUT})^2 = 9/4 + \quad (16)$$
$$3R(\Delta_2)\sin(\Delta_2 t + \delta_2 + \theta(\Delta_2)) + 3R(\Delta_3)\sin(\Delta_3 t + \delta_3 + \theta(\Delta_3)) +$$
$$R^2(\Delta_2)\sin^2(\Delta_2 t + \delta_2 + \theta(\Delta_2)) + R^2(\Delta_3)\sin^2(\Delta_3 t + \delta_3 + \theta(\Delta_3)) +$$
$$2R(\Delta_2)R(\Delta_3)\sin(\Delta_2 t + \delta_2 + \theta(\Delta_2))\sin(\Delta_3 t + \delta_3 + \theta(\Delta_3))$$

Note that if the DC term of the $P_{DUT\text{-}OUT}$ had been filtered out the first three terms of the preceding equation would vanish.

It can be shown that the voltage $V_{MIX\text{-}OUT}$ includes modulation at a frequency $\Delta_2 - \Delta_3$, which is the same as the frequency of the first beat note $\Delta_1$. It can also be shown that $V_{MIX\text{-}OUT}$ includes a phase that depends on a phase response of the DUT 301 at the frequencies of the second and third beat notes $\Delta_2$, $\Delta_3$. Specifically, the last term of the above equation may be rewritten using the well known trigonometric identity $$\sin(a)\sin(b) = \tfrac{1}{2}\sin(a+b) + \tfrac{1}{2}\sin(a-b). \quad (17)$$

Thus, $$V_{MIX\text{-}OUT} == \quad (18)$$
$$9/4 + 3R(\Delta_2)\sin(\Delta_2 t + \delta_2 + \theta(\Delta_2)) + 3R(\Delta_3)\sin(\Delta_3 t + \delta_3 + \theta(\Delta_3)) +$$
$$R^2(\Delta_2)\sin^2(\Delta_2 t + \delta_2 + \theta(\Delta_2)) + \frac{1}{4}R^2(\Delta_3)\sin^2(\Delta_3 t + \delta_3 + \theta(\Delta_3)) +$$
$$R(\Delta_2)R(\Delta_3)\sin(\Delta_2 t + \delta_2 + \theta(\Delta_2) + \Delta_3 t + \delta_3 + \theta(\Delta_3)) +$$
$$R(\Delta_2)R(\Delta_3)\sin(\Delta_2 t + \delta_2 + \theta(\Delta_2) - \Delta_3 t - \delta_3 - \theta(\Delta_3))$$

The first six terms may be ignored because they involve modulation at the higher frequencies of $\Delta_2$ and $\Delta_3$ and only frequencies of order $\Delta_1$ are relevant to the phase measurement. Furthermore, the higher frequencies $\Delta_2$, $\Delta_3$, $\Delta_2 + \Delta_3$, $2\Delta_2$, $2\Delta_3$ may be filtered out, e.g., with a suitably characterized low pass filter, without affecting the phase measurement. Using the fact that $\Delta_2 - \Delta_3 = -\Delta_1$, the fact that $\delta_2 - \delta_3 = -\delta_1$ and $-\sin(-a) = \sin(a)$ the last term may be rewritten so that:

$$V_{MIX\text{-}OUT} = R(\Delta_2)R(\Delta_3)\sin(\Delta_1 t + \delta_1 + \theta(\Delta_2) - \theta(\Delta_3)) \quad (19)$$

which is the relevant portion of the mixed output 311.

As stated above the mixed output 311 contains information about the phase response of the DUT 301 at the frequencies of the first and second beat notes $\Delta_2$, $\Delta_3$. Furthermore, the mixed output 311 includes modulation at the same frequency as the first beat note $\Delta_1$. It is therefore possible to extract information about the phase response of the DUT 301 by detecting the phase difference between the mixed output signal 311 and a reference signal having the same frequency as and a known phase with respect to the first beat note $\Delta_1$. As used herein, the phase of the reference signal "known" if its value has been measured, assumed, derived from first principles, or can be considered irrelevant to the measurement of the phase response of the DUT 301. In many applications it is often desirable that the phase of the reference signal be consistent over time.

Referring again to FIG. 4, at 410 a reference signal is produced. The reference signal has the same frequency as and a known phase with respect to the first beat note $\Delta_1$. There are numerous ways to produce such a signal. For example, the combiner 306 may extract a portion of the original heterodyne modulated optical signal 307 that contains only the first beat note $\Delta_1$ to be used as a reference signal 313. The reference signal 313 may be in the form of an electrical signal converted from an appropriate portion of the heterodyne modulated optical signal 307. Alternatively, the reference signal 313 may be in the form of an optical signal. In addition, the third component $\Delta_1'$ of the DUT output signal 309 may be used as the reference signal.

As described above, if the frequency of the first beat note $\Delta_1$ is sufficiently low, e.g., less than about 1 GHz, the DUT 301 may have no effect on its phase. Even if the DUT 301 has an effect on the phase of the first beat note $\Delta_1$, if the frequency of the first beat note is sufficiently low such an effect is measurable with low-speed electronics and may be compensated for. Thus, if the effect of the DUT 301 on the phase of the first beat note $\Delta_1$ is known or knowable, the third component $\Delta_1'$ of the DUT output signal 309 may be used as the reference signal. With appropriate normalization, the power of the reference signal 313 (if optical) or the voltage of the reference signal (if electrical) may be given by:

$$P_{ref} \text{ or } V_{ref} = 3/2 + \sin(\Delta_1 t + \delta_1) \quad (20)$$

Independent of how the reference signal is produced, at 412 a phase difference is measured between the mixed output signal 311 and the reference signal. For example, the PMD 312 may be a low-speed mixer that combines the reference signal 313 with the mixed output signal 311. The reference signal 313 containing the first beat note $\Delta_1$ is coupled to the low-speed mixer by a suitable connection. The low-speed mixer produces a DC output voltage 315 having an amplitude that depends on the relative phase of the mixed output 311 with respect to the reference signal 313. The low-speed mixer may also produce an output at a frequency of $2\Delta_1$, which may be filtered out. One example, among others, of a suitable low-speed mixer is a Model SYPD-1 from Mini-Circuits of Brooklyn, N.Y., optimized for phase detection. Such a mixer utilizes an electrical signal as the reference signal 313. Alternatively, the low-speed mixer may be a high-speed mixer as defined above.

Alternatively, the function of the PMD 312 may be provided using an optical signal as the reference signal 313 in an alternative phase measuring device (PMD) 312B as depicted in FIG. 3B. The alternative PMD 312B utilizes an EO modulator 314 that is optically coupled to an optical power detector 316. The mixed output 311 and an optical reference signal 313' are coupled to the EO modulator 314. In the EO modulator 314, the mixed output 311 modulates the reference signal 313' to produce a mixed optical output 317. The optical power detector 316 converts the mixed optical output 317 to a corresponding electrical output 315' that is related to the average power of the mixed optical output 317. Both the mixed output 311 and the reference signal 313' include modulation at the first beat note frequency $\Delta_1$. If $\Delta_1$ is sufficiently low, the modulator 314 and optical power detector 316 need not rely on high-speed opto-electronics and expensive calibration.

Furthermore, the function of the PMD 312 may be implemented digitally, either in hardware or software by a suitable digital signal processing (DSP) device. Such a DSP device may be, for example, an application specific integrated circuit (ASIC) or a suitable program code running on a processor of a general purpose computer. To implement the phase measurement, the DSP device samples the mixed output 311 and the reference signal 313 with respect to time. By way of example, for a value of $\Delta_1$ of roughly 10 MHz, about 1000 samples may be taken at a rate roughly 100 million samples per second. Digital signal processing routines that are well known in the art may then be applied to the measured samples to determine the phase between the mixed output 311 and the reference signal 313.

The output of the PMD 312 (or 312B) is a product of the reference signal (eq. 20) and the relevant portion of $V_{MIX\text{-}OUT}$ (eq. 19). The output of interest from the PMD 312 (or 312B) has the form:

$$V_{PMD\ out} = \sin(\Delta_1 t + \delta_1) R(\Delta_2) R(\Delta_3) \sin(\Delta_1 t + \delta_1 + \theta(\Delta_2) - \theta(\Delta_3)) \quad (21)$$

Equation (21) may be expanded using the trigonometric relation of equation (17) and rewritten as:

$$V_{PMD\ out} = \tfrac{1}{2} R(\Delta_2) R(\Delta_3) \sin(2\Delta_1 t + \delta_1 + \theta(\Delta_2) - \theta(\Delta_3)) + \tfrac{1}{2} R(\Delta_2) R(\Delta_3) \sin(\theta(\Delta_2) - \theta(\Delta_3)) \quad (22)$$

The second term of equation (22), known as the DC term, is a DC output voltage that depends on the phase response of the DUT 301 at the modulation frequencies of the second and third beat notes $\Delta_2$, $\Delta_3$. If the frequency of the first beat note $\Delta_1$ is made small, i.e., as $f_1$ approaches $f_2$, the frequency of the second beat note $\Delta_2$ approaches the frequency of the third beat note $\Delta_3$. Thus, $\theta(\Delta_2)\ \theta(\Delta_3)$ and $R(\Delta_2)\ R(\Delta_3)$. Furthermore as $\theta(\Delta_2)\ \theta(\Delta_3)$:

$$\sin[\theta(\Delta_2) - \theta(\Delta_3)]\ [\theta(\Delta_2) - \theta(\Delta_3)]\ \Delta_1 (d\theta)(\Delta)/d\Delta \quad (23)$$

Thus, the DC output voltage from the low-speed mixer may be written as $$\tfrac{1}{2} R(\Delta_2)\ R(\Delta_3) \Delta_1 (d\theta(\Delta)/d\Delta) \quad (24)$$

The term $(d\theta(\Delta)/d\Delta)$ represents the derivative of the phase response $\theta(\Delta)$ of the DUT 301 with respect to modulation frequency $\Delta$. This quantity is sometimes referred to as the dispersion of the DUT 301. In some applications, only the dispersion of the DUT 301 is of interest. Useful information about the phase response $\theta(\Delta)$ of the DUT 301 may thus be obtained from the DC output of the PMD 312 (or 312B). For example, it is often desirable to determine information about the phase response of the DUT 301 as a function of frequency. Referring to FIG. 4 at 414 the frequencies of the second and third beat notes $\Delta_2$, $\Delta_3$ may optionally be swept relative to the frequency of the first beat note $\Delta_1$ to characterize the dispersion $(d\theta(\Delta)/d\Delta)$ of the DUT 301 over some frequency range of interest. Although not strictly necessary, it is preferable to sweep the frequencies of the second and third beat notes $\Delta_2$, $\Delta_3$ together so that the frequency of the first beat note $\Delta_1$ remains substantially constant.

If $\Delta_2$ and $\Delta_3$ are swept relative to $\Delta_1$ the phase response $\theta(\Delta)$ may be obtained by optionally integrating the dispersion $(d\theta(\Delta)/d\Delta)$ with respect to modulation frequency $\Delta$, at 416. Referring again to FIG. 3A an optional integrator 318 may be coupled to the low-speed mixer. By way of example the integrator 318 may be implemented using an operational amplifier. Alternatively, if the sweep rate is low enough, the integration may be implemented in software.

As noted above, the frequency difference $\Delta_2 - \Delta_3$ between the second and third beat notes affects both the sensitivity and the resolution of phase measurements made in accordance with embodiments of the present invention. In general, the larger the frequency difference, the better the sensitivity; the lower the frequency difference, the better the resolution. Thus there is a tradeoff between sensitivity and resolution. However, by adjusting the frequency difference $\Delta_2 - \Delta_3$ the tradeoff can be made adjustable.

No high-speed OE detectors requiring high-speed response or calibration are required in embodiments of the present invention. Furthermore, embodiments of the invention do not require the use of any high-speed voltage controlled oscillators. Low-speed electronics may be used for the PMD 312 (or 312B), and the integrator 318 and the detector and/or electronics that create the reference signal 313 (or 313'). The high-speed mixer 310 is typically the only costly component in the apparatus 300; however, it is easy to calibrate with an RF network analyzer (not shown). Since the embodiments described herein rely on low-speed electronics they are much less expensive to implement than prior art phase measurement techniques used at high frequencies. Furthermore, in embodiments employing the alternative PMD 312B, low-speed opto-electronics may be used in the modulator 314 and the optical power detector 316.

It is desirable to calibrate frequency differences of the lasers 303, 304, 305 in order to reproducibly generate the three beat notes $\Delta_1$, $\Delta_2$, $\Delta_3$ of the desired frequencies. This is fairly straightforward for the first beat note $\Delta_1$ since its frequency is sufficiently low that, e.g., it can be detected using low-speed opto-electronics and locked to a digitally synthesized reference or quartz crystal oscillator. The second and third beat notes are more problematic in that their frequencies $\Delta_2$, $\Delta_3$ may lie outside the range of economical low-speed detectors. Fortunately it is possible to use a ladder calibration technique to calibrate the frequency difference between different pairs of the lasers 303, 304, 305 over an extended range without the use of high-speed opto-electronics. A ladder calibration may proceed by tuning the lasers in coordination with respect to one or more relatively low frequency ranges to characterize one or more tuning parameters of each of the lasers in the pair over an extended frequency range. An example of such a ladder calibration is described in commonly assigned U.S. patent application Ser. No. 10/006,786 to Frank J. Adams, filed Dec. 5, 2001 and entitled "CALIBRATING A FREQUENCY DIFFERENCE BETWEEN TWO OR MORE LASERS OVER AN EXTENDED FREQUENCY RANGE," the disclosures of which are incorporated herein by reference.

Figure 5:
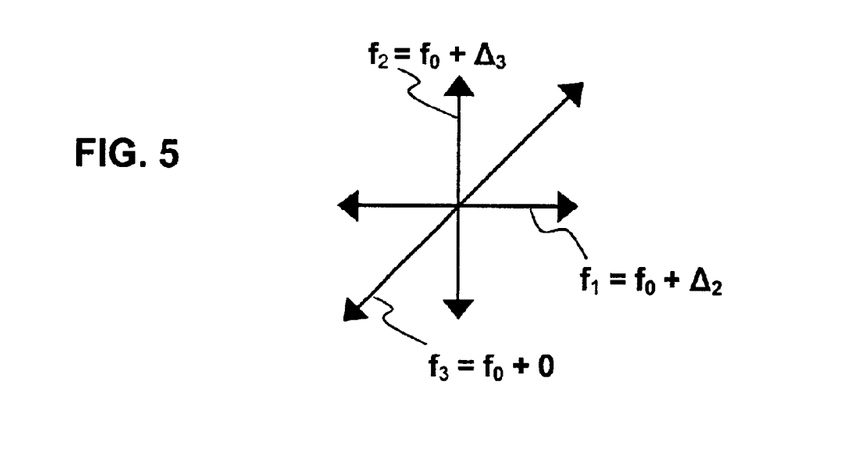
FIG. 5 depicts a polarization diagram illustrating a possible configuration for the polarizations of signals used in an embodiment of the present invention.

Embodiments of the phase response measurement technique described with respect to FIGS. 3A–3B and FIG. 4 may be varied without departing from the scope of the present invention. For example, as described above, it is desirable to eliminate or greatly reduce the amount of the low frequency component $\Delta_1{}'$ of the output 309 of the DUT 301. This may be accomplished, e.g., by eliminating or reducing the amount of the first beat note $\Delta_1$ in the portion of the heterodyne modulated optical signal that reaches the DUT 301. One way, among others, to accomplish this is through appropriate polarization of the signals $f_1$, $f_2$, $f_3$ from the lasers 303, 304, 305. For example, the signals $f_1$, $f_2$, $f_3$ may be polarized as shown in FIG. 5. In this particular example, the first signal $f_1$ is polarized orthogonal to the second signal $f_2$, while the third signal $f_3$ is polarized such that it has a projection onto both the first signal $f_1$ and the second signal $f_2$. In the example depicted in FIG. 5 the third signal $f_3$ is polarized at 45° with respect to both the first signal $f_1$ and the second signal $f_2$. Alternatively, third signal $f_3$ may be right or left circularly polarized. If the first signal $f_1$ differs in frequency from the second signal $f_2$ by an amount equal to the first beat note $\Delta_1$, as described above any superposition between them will produce the first beat note $\Delta_1$ in the heterodyne modulated optical signal 307. Because the first signal $f_1$ and second signal $f_2$ are polarized orthogonal to each other, there is very little if any superposition of these two signals and hence very little, if any, of the first beat note $\Delta_1$ will be present in the heterodyne modulated optical signal 307.

In the example described above with respect to FIGS. 3A–3B and FIG. 4, the first and second signals $f_1$, $f_2$ differ in frequency from the third signal $f_3$ by amounts respectively equal to the second and third beat notes $\Delta_2$, $\Delta_3$. Thus, superposition between the second signal $f_2$ and the third signal $f_3$ produces the second beat note $\Delta_2$ and the superposition between the first signal $f_1$ and the third signal $f_2$ produces the third beat note $\Delta_3$. But, since the third signal $f_3$ includes a component that is parallel to the first signal $f_1$ and another component that is parallel to the second signal $f_2$, the third signal $f_3$ will superpose at least partially with the first and second signals $f_1$, $f_2$ thereby producing the second and third beat notes $\Delta_2$, $\Delta_3$ in the heterodyne modulated optical signal 307. Portions of the first and second signals $f_1$, $f_2$ may be split off, e.g., by the combiner 306, and after appropriate polarization manipulation they may be combined to produce the reference signal 313 that is characterized by the first beat note frequency $\Delta_1$. Thus it is possible to use the combiner 306 as a reference signal generator.

Figure 6A:
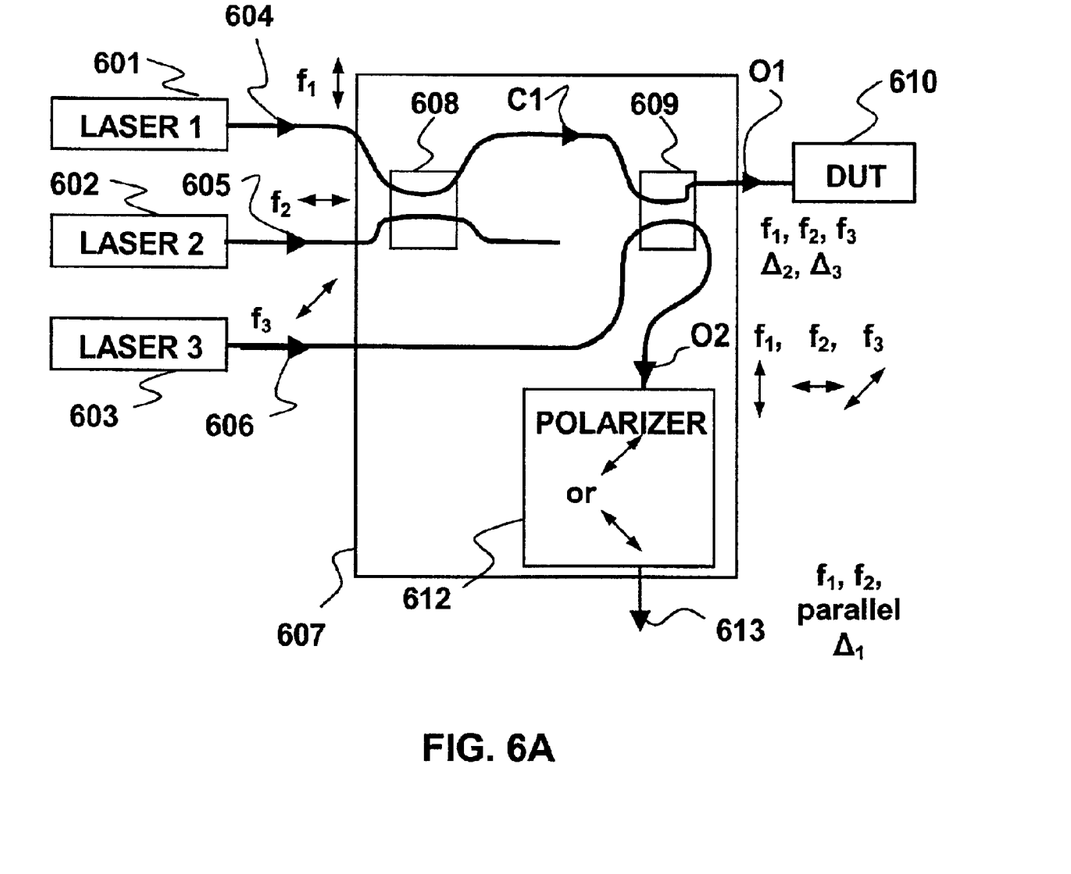
FIG. 6A depicts a block diagram of a first alternative scheme for generating the polarized heterodyne modulated optical signal of the type described above with respect to FIG. 5.

FIG. 6A depicts a first alternative scheme for generating the polarized heterodyne modulated optical signal of the type described above with respect to FIG. 5 and a reference signal of the type described above with respect to FIGS. 3A–3B and FIG. 4. In this scheme, three lasers 601, 602, 603 respectively produce first second and third optical signals 604, 605, 606 that are respectively characterized by frequencies $f_1$, $f_2$, and $f_3$. The first and second optical signals are substantially mutually orthogonal as indicated by the arrows. The third optical signal 606 has a polarization oriented substantially at 45° with respect to the first and second signals. As used herein, "substantially" means "within an acceptable tolerance of being exact." Since lasers may produce polarized optical signals, the desired polarizations for the first second and third signals 604, 605, 606 may be obtained by suitable configuration of the lasers 601, 602, 603. A combiner 607 combines the signals 604, 605, 606. The combiner 607 may be regarded as one of many possible examples of the combiner 306 depicted in FIG. 3A. The combiner 607 preferably includes an orthogonal coupler 608 and an optical coupler 609.

As used herein, the term optical coupler refers generically to a device that receives two or more optical inputs and produces a combined optical output. Two examples of optical couplers include orthogonal couplers and partial couplers. Orthogonal couplers operate by transmitting optical signals of a particular polarization while reflecting signals of an orthogonal polarization. Partial couplers produce an output containing a fraction of each of the inputs where the fraction is nominally independent of the polarization state of the inputs.

Alternatively, the combiner 607 may include a partial coupler (e.g., 50:50 couplers) in place of the orthogonal coupler 608. The advantage to using an orthogonal coupler is that orthogonal couplers have no intrinsic loss when combining two orthogonal inputs. Any ratio for the partial coupler will work in principle so long as it is not 100:0, although with less signal than with a 50:50 coupler. The orthogonal coupler 608 is a device that combines two or more signals having orthogonal polarizations. Possible examples, among others, of such devices are polarizing beamsplitters and dichroic mirrors. The orthogonal coupler 608 is optically coupled to the first and second lasers 601, 602. The optical coupler 609 may be a partial coupler, e.g., 50:50–90:10. Inputs of the optical coupler 609 are optically coupled to the third laser 603 and the orthogonal coupler 608. Outputs of the optical coupler 609 are coupled to a device under test (DUT) 610 and a polarizer 612.

The orthogonal coupler 608 combines the first and second optical signals 601, 602 to produce a combined signal C1. The combined signal C1 contains portions of both the first and second signals 604, 605 but, because these two signals are polarized in a substantially mutually orthogonal fashion there is very little, if any, superposition that would produce heterodyne modulation at the first beat note frequency $\Delta_1$. The combine signal C1 is coupled from the orthogonal coupler 608 to the optical coupler 609 where the third optical signal 606 interacts with the combined signal C1 to produce a first output and a second output O2.

Since the third optical signal 606 contains components that are parallel to both the first and second signals 604, 605, portions of the second and third signals 605, 606 superpose to produce modulation at the second beat note frequency $\Delta_2$ and portions of the first and third signals 604, 606 superpose to produce modulation at the third beat note frequency $\Delta_3$. Thus, the first and second outputs O1, O2 each contain portions of the first, second and third signals 604, 605, 606. Furthermore, the first and second outputs O1, O2 include heterodyne modulation at both the second and third beat note frequencies $\Delta_2$, $\Delta_3$, but very little, if any modulation at the first beat note frequency $\Delta_1$. The first output O1 may be coupled to the DUT 610.

The second output O2 is coupled to the polarizer 612 to produce a reference signal 613 that is heterodyne modulated at the first beat note frequency $\Delta_1$. In particular, the polarizer 612 has a polarizing axis that is oriented substantially at 45° with respect to the polarizations of the first and second signals 604, 605. The polarizing axis may be either parallel or orthogonal to the polarization of the third signal 606. Since second output O2 includes components having polarizations and frequencies that correspond to those of the first and second signals 604, 605 the polarizer 612 will transmit portions of those components such that they are substantially parallel to each other. Consequently the portions of the first and second signals 604, 605 that emerge from the polarizer 612 will interfere with each other to produce the reference signal 613 with heterodyne modulation at the first beat note $\Delta_1$. The reference signal 613 is a heterodyne modulated optical signal. If desired, the reference signal 613 may be converted to an electrical signal with a suitable EO converter (not shown), e.g., so that it can be mixed in the low-speed mixer 312. If desired, the polarizer 612 may be configured such that the reference signal 613 may contain modulation at the first beat note $\Delta_1$ but very little, if any, modulation at the second and third beat notes $\Delta_2$, $\Delta_3$. Specifically, if the polarization axis of the polarizer 612 is oriented substantially orthogonal to the polarization of the third signal 606 the polarizer 612 will transmit very little if any of the second signal and third signals 605, 606. In such a case there will be very little if any superposition in the reference signal that produces the second or third beat notes $\Delta_2$, $\Delta_3$. If, in addition to the first beat note $\Delta_1$, modulation at the second and third beat notes $\Delta_2$, $\Delta_3$ is desired the polarization axis of the polarizer 612 may be oriented substantially parallel to the polarization of the third optical signal.

Figure 6B:
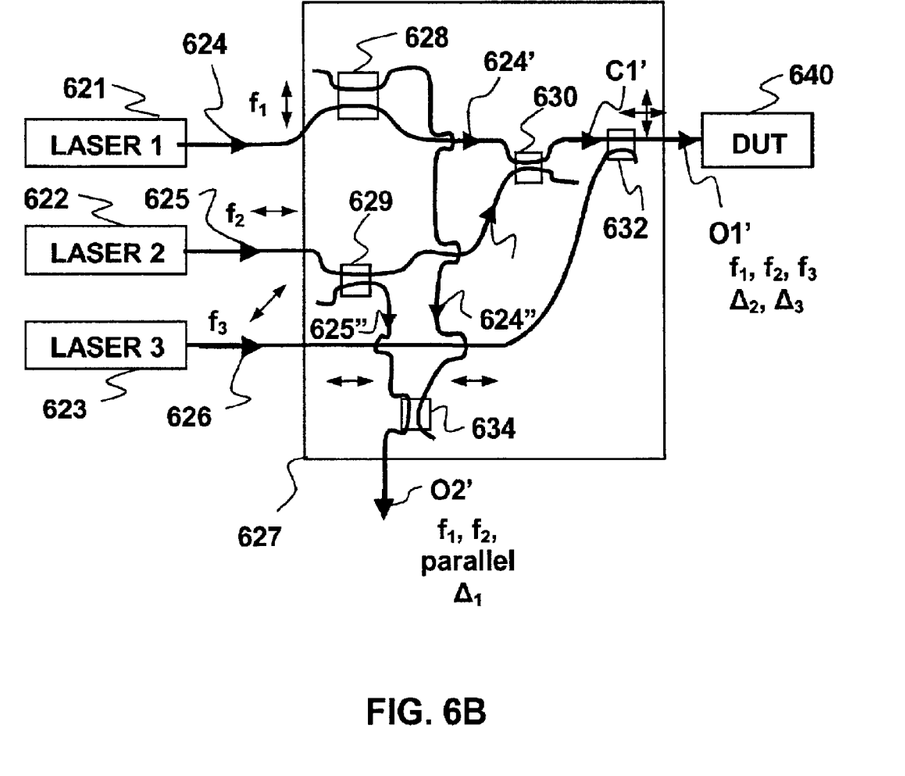
FIG. 6B depicts a block diagram of a second alternative scheme for generating the polarized heterodyne modulated optical signal of the type described above with respect to FIG. 5.

The scheme described above with respect to FIG. 6A may be implemented in a relatively straightforward fashion in an apparatus of the type described above with respect to FIGS. 3A–3B to implement the method described above with respect to FIG. 4. Some losses in signal strength (typically >50% loss per device) may be associated with the use of the optical coupler 609 and the polarizer 612. There are other possible variations on the scheme described above with respect to FIG. 6A. For example, FIG. 6B depicts a second alternative scheme for generating the polarized heterodyne modulated optical signal of the type described above with respect to FIG. 5 and a reference signal of the type described above with respect to FIGS. 3A–3B and FIG. 4. In the second alternative scheme, three lasers 621, 622, 623 respectively produce first, second and third optical signals 624, 625, 626 characterized by frequencies $f_1$, $f_2$, $f_3$. The first and second signals 624, 625 have substantially orthogonal polarizations and the third signal 626 has a polarization oriented substantially at 45° to the polarizations of both the first and second signals 624, 625. The desired polarizations for the signals 624, 625, 626 may be obtained by suitable configuration of the lasers 621, 622, 623.

The signals 624, 625, 626 are coupled to a combiner 627, which may be regarded as a particular example of the combiner 306 of FIG. 3A. The combiner 627 includes two partial splitters 628, 629, an orthogonal coupler 630 and first and second optical couplers 632, 634. The partial splitters 628, 629 respectively transmit first portions 624', 625' and second portions 624", 625" of the first and second signals 624, 625. The first portions 624', 625' are coupled to the orthogonal coupler 630. Since the first and second signals 624, 625 are mutually orthogonal the first portions 624', 625' combine without substantially interfering to produce a combined signal C1'. The first optical coupler 632 then combines the third signal $f_3$ with the combined signal to produce a first output O1', which may be coupled to a DUT 640. Since the third signal $f_3$ is polarized substantially at 45° with the respect to the polarizations of the first and second signals $f_2$, $f_3$ the first output O1' includes heterodyne modulation at the second and third beat notes for the reasons described above. The coupler 632 may be a partial splitter.

The second optical coupler 634 combines the second portions 624", 625" of the first and second signals 624, 625 to produce a second output O2' having components corresponding to the first and second signals $f_1$, $f_2$. The combiner 627 is capable of manipulating the polarization of either or both of the second portions 624", 625" such that the $f_1$ and $f_2$ components are polarized substantially parallel to each other in the second output $O_2'$. Since the $f_1$ and $f_2$ components are polarized substantially parallel to each other in the second output O2', these components interfere to produce heterodyne modulation at the first beat note frequency $\Delta_1$ of the second output O2'. The second output O2' may provide the reference signal described above with respect to FIGS. 3A–3B and FIG. 4. The desired polarization manipulation may be implemented, e.g., by a half-waveplate, twisted PM fiber, periscope, or polarization rotator incorporated into either or both of the partial splitters 628, 629 or the second combiner 634. Alternatively, the desired manipulation of the polarizations of the second portions 624", 625" may be implemented by a waveplate or polarization rotator disposed along an optical path between the first partial splitter 628 and the second optical coupler 634 and/or along an optical path between the second partial splitter 629 and the second optical coupler 634.

The embodiments described facilitate phase response characterization of a device under test without requiring substantial high-speed opto-electronics or a reference detector. Since the embodiments described herein rely on low-speed electronics they are much less expensive to implement than prior art phase measurement techniques used at high frequencies.

Figure 6C:
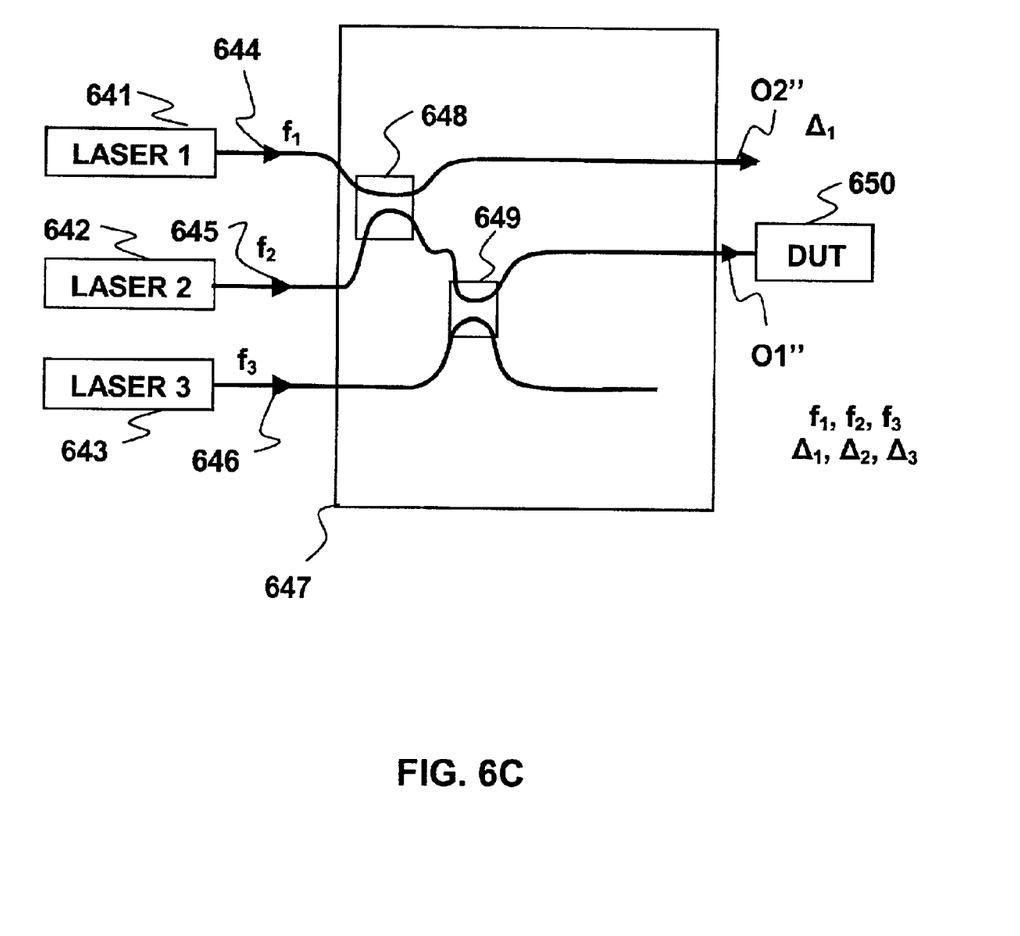
FIG. 6C depicts a block diagram of a third alternative scheme for generating a heterodyne modulated optical signal.

The heterodyne modulated optical signal described above with respect to FIGS. 3A–3B and FIG. 4 may be implemented with or without taking advantage of polarization in a third alternative scheme depicted in FIG. 6C. In the third alternative scheme, three lasers 641, 642, 643 respectively produce first, second and third optical signals 644, 645, 646 characterized by frequencies $f_1$, $f_2$, $f_3$. The signals 644, 645, 646 are coupled to a combiner 647, which may be regarded as a particular example of the combiner 306 of FIG. 3A. The combiner 647 includes two optical couplers 648, 649. The optical couplers 648, 649 may be partial couplers, e.g. 50:50 couplers or any other suitable ratio couplers. The first and second lasers 641, 642 are optically coupled to the first optical coupler 648. The third laser 643 optically and the first optical coupler 648 are optically coupled to the second optical coupler 649. The first coupler 648 receives the first and second signals 644, 645, which interfere to produce combined signals O2" and C1" having heterodyne modulation at the first beat note frequency $\Delta_1$. One of the signals, e.g., signal O2" may be used as the reference signal 313, either directly, as in FIG. 3B or after conversion to an electrical signal by an appropriate OE converter. The other combined signal C1" couples with the third signal 646 in the second optical coupler 649 to produce outputs that include modulation at all three beat notes $\Delta_1$, $\Delta_2$ and $\Delta_3$. One of these outputs O1" may serve as the heterodyne optical signal 307 of FIG. 3A.

Since the output O1" will have a substantial superposition of $f_1$ and $f_2$, a heterodyne product at the first beat note frequency $\Delta_1$ will be created. If a DUT 650 exhibits a response at this frequency, it will create an electrical signal at the first beat note frequency $\Delta_1$, which could be used as the reference signal provided to the PMD 312 in FIG. 3A. However, this necessitates either a high pass filter, such as HPF 308, or puts additional isolation requirements on PMD 312. Since both of these electrical devices must accommodate electrical signals at the relatively high frequencies of the second and third beat notes $\Delta_2$, $\Delta_3$, their phase response at $\Delta_2$ and $\Delta_3$ must be known and accounted for in the phase response measurement of the DUT 301.

FIGS. 3A–3B, 5 and 6A–6C and their associated descriptions relate the use a heterodyne source having three lasers to produce a heterodyne modulated output characterized by three beat note frequencies. Alternatively, the heterodyne source may use only two lasers to produce a substantially equivalent heterodyne modulated output. Alternative heterodyne sources are shown in FIG. 7 and FIG. 8.

Figure 7:
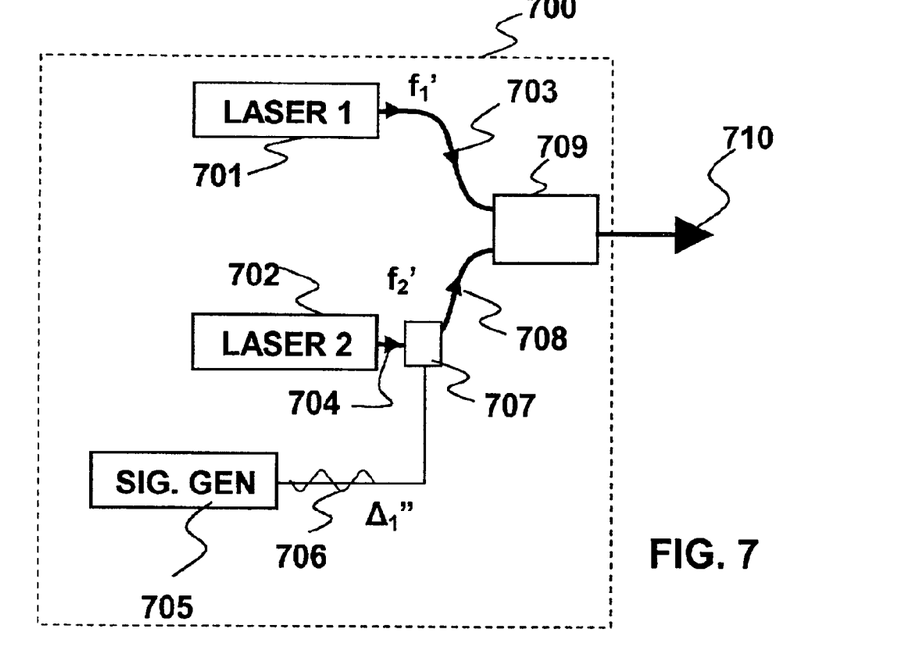
FIG. 7 depicts a block diagram of an alternative heterodyne source that may be used in embodiments of the present invention.
Figure 8:
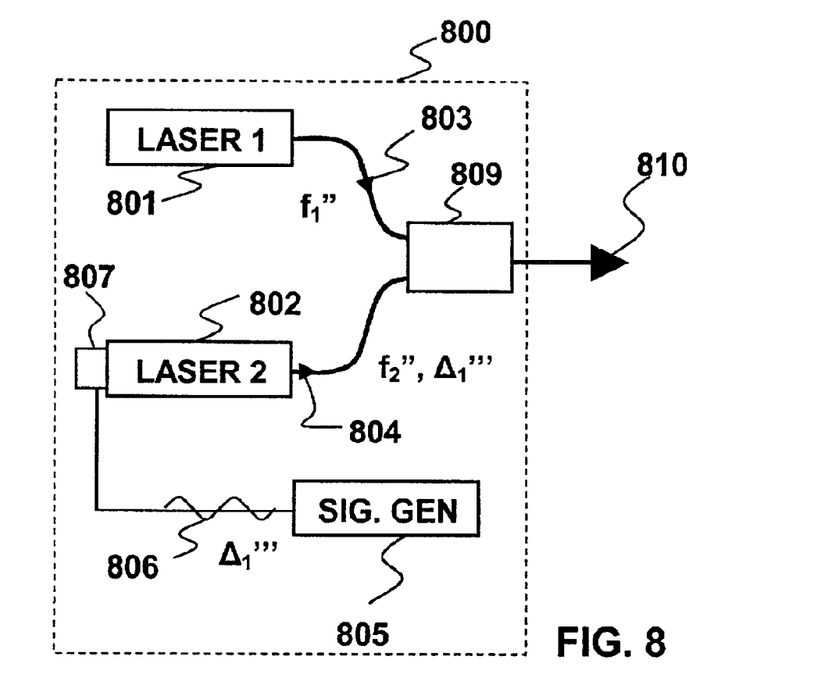
FIG. 8 depicts a block diagram of another alternative heterodyne source that may be used in embodiments of the present invention.

FIG. 7 depicts an alternative optical heterodyne source 700. The heterodyne source 700 may be used in place of the heterodyne source 302 of FIG. 3A and may be tuned as described below with respect to FIG. 8. Furthermore production of a heterodyne modulated optical signal (e.g., at 402 of FIG. 4) may be implemented as described below in association with the source 700. The heterodyne source 700 includes first and second lasers 701, 702, a signal generator 705, an optical modulator 707 and a combiner 709. The optical modulator 707 is optically coupled between one of the lasers 701, 702 (e.g., the second laser 702) and the combiner. Optical connections within the optical heterodyne source 700 and/or between the source 700 and a DUT may be implemented, e.g., using fiber. Alternatively, such optical connections may be implemented in free space or with optical waveguides. The signal generator 705 may be electrically coupled to the optical modulator 707.

The lasers 701, 702 may be, e.g., any of the types described above with respect to FIG. 3A. The first and second lasers 701, 702 respectively produce first and second optical signals 703, 704 that are respectively characterized by optical frequencies $f_1'$ and $f_2'$, which may lie in an optical frequency range of, e.g., roughly 100–1000 THz. It is desirable that the optical frequencies $f_1$ and $f_2$ differ by an amount $\Delta_2'$ such that, e.g.:

$$f_1' = f_2' + \Delta_2' \quad (25)$$

The signal generator 705 produces a modulating signal 706. In response to the modulating signal 706, the optical modulator 707 modulates one of the optical signals 703, 704 (e.g., the second optical signal 704 to produce a modulated optical signal 708. By way of example, the optical modulator 707 may modulate an amplitude or polarization of the second optical signal to produce the modulated optical signal 708. The modulating signal 706 is characterized by modulation at a frequency $\Delta_1''$. Consequently, the modulated optical signal 708 includes modulation at the frequency $\Delta_1''$. The combiner 709 combines the first optical signal 703 with the modulated optical signal 708 to produce a heterodyne modulated optical signal 710. The combiner 709 may be a partial coupler such as a beam splitter, fiber coupler or free-space coupler. The superposition of the first optical signal 703 with the modulated optical signal 708 may provide the heterodyne modulated optical signal 710 with modulation at the frequencies of $\Delta_1''$, $\Delta_2'$, and $\Delta_3'$, where $\Delta_3'$ represents the sum frequency:

$$\Delta_3' = \Delta_1'' + \Delta_2' \quad (26).$$

It is desirable that $\Delta_1''$ be substantially less than the frequency difference $\Delta_2'$ between $f_1'$ and $f_2'$. The upper limit on the values of $\Delta_2'$ depends on the tuning range of the lasers 701, 702. As a numerical example, $\Delta_1''$ may be between about 10 MHz and about 10 GHz and $\Delta_2'$ may be between about 100 MHz and about 500 GHz, depending on the value of $\Delta_1''$. With appropriate modulation of the polarization of the first and second optical signals 703, 704 and suitable combination of these two signals by the combiner 709 it is possible to produce a heterodyne modulated optical signal 710 characterized by substantial modulation at $\Delta_2'$, and $\Delta_3'$ with very little, if any, significant modulation at $\Delta_1''$.

FIG. 8 depicts a block diagram of an optical heterodyne source 800, which is a variation on the optical heterodyne source 700 of FIG. 7. The heterodyne source 800 may be used in place of the heterodyne source 302 of FIG. 3A. Furthermore production of a heterodyne modulated optical signal (e.g., at 402 of FIG. 4) may be implemented as described below in association with the source 800. The heterodyne source 800 includes first and second lasers 801, 802, a signal generator 805, and a combiner 809. The lasers 801, 802 may be, e.g., any of the types described above with respect to FIG. 3A. Optical connections within the optical heterodyne source 800 and/or between the source 800 and a DUT may be implemented, e.g., using fiber. Alternatively, such optical connections may be implemented in free space or with optical waveguides. The signal generator 805 may be electrically coupled to a tuning controller (TC) 807 associated with one or more of the lasers 801, 802. In the example shown in FIG. 8, the tuning controller 807 is associated with the second laser 802. Although a single tuning controller 807 is shown for the sake of simplicity, in practice two tuning controllers may be used, one for each of the lasers 801, 802. The tuning controller 807 may control a tuning parameter that affects the amplitude of a signal produced by the laser 802. By way of example, and without limitation, the tuning controller 807 may vary a diode current of the laser that it controls.

The first and second lasers 801, 802 respectively produce first and second optical signals 803, 804 that are respectively characterized by optical frequencies $f_1''$ and $f_2''$, which may lie in the optical frequency range described above with respect to the optical frequencies $f_1'$ and $f_2'$. The optical frequencies $f_1''$ and $f_2''$ may differ by a frequency difference $\Delta_2''$ such that, e.g.:

$$f_1'' = f_2'' + \Delta_2'' \quad (27)$$

The signal generator 805 produces a modulating signal 806. In response to the modulating signal, the tuning controller 807 modulates a tuning parameter of one or more of the lasers 801, 802 (e.g., the second laser 802) such that the laser produces a modulated optical signal (e.g. the second signal 804) that is characterized by modulation at a frequency $\Delta_1'''$. The combiner 809 combines the first optical signal 803 with the modulated optical signal 808 to produce a heterodyne modulated optical signal 810. The superposition of the first and second optical signals 803, 804 may provide the heterodyne modulated optical signal 810 with modulation at beat note frequencies corresponding to $\Delta_1'''$, $\Delta_2''$, and $\Delta_3''$, where $\Delta_3''$ represents the sum frequency $$\Delta_3'' = \Delta_1''' + \Delta_2'' \quad (28)$$

The frequency $\Delta_1'''$ may be substantially less than the frequency difference $\Delta_2''$. The upper limit on the values of $\Delta_2''$ depends on the tuning ranges of the lasers 801, 802. As a numerical example, $\Delta_1'''$ may be between about 10 MHz and about 10 GHz and $\Delta_2''$ may be between about 100 MHz and about 500 GHz, depending on the value of $\Delta_1'''$.

FIG. 7 and FIG. 8 depict two of many possible alternative examples of production of a heterodyne modulated optical signal characterized by modulation at two or more beat note frequencies. Other examples may be devised without departing from the scope of the present invention. For example, some combination of optical signal modulation and laser tuning parameter modulation may be devised to produce the desired optical heterodyne signal.

While the above is a complete description of the preferred embodiment of the present invention, it is possible to use various alternatives, modifications and equivalents. For example, four or more different lasers may be used to generate a heterodyne modulated optical signal. A four-laser configuration may provide advantages with respect to modularity of construction. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A method for measuring a phase response of a device under test (DUT) with respect to a modulated optical signal, comprising:

producing a heterodyne modulated optical signal including first, second, and third beat notes;

coupling at least a portion of the heterodyne modulated optical signal to the DUT;

wherein the portion of the heterodyne modulated optical signal that is coupled to the DUT includes modulation at least at the frequencies of the second and third beat notes;

producing an output signal with the DUT;

wherein the output signal includes at least first and second components having frequencies respectively corresponding to the frequencies of the second and third beat notes;

mixing the first and second components to produce a mixed output signal;

producing a reference signal having the same frequency as and a known phase with respect to the first beat note; and measuring a phase difference between the mixed output signal and the reference signal.

2. The method of claim 1, further comprising sweeping the frequncies of the second and third beat notes relative to the first beat note.

3. The method of claim 2 further comprising integrating the phase difference between the mixed output signal and the reference signal.

4. The method of claim 1 wherein the first beat note has a frequecy of between zero and about 10 GHz.

5. The method of claim 4 wherein the second and third beat notes have frequencies greater than about 0.1 GHz.

6. The method of claim 4 wherein the second and third beat notes have frequencies greater than about 1 GHz.

7. The method of claim 4 wherein the second and third beat notes have frequencies greater than about 10 GHz.

8. The method of claim 7 wherein the second and third beat notes have frequencies of about 50 GHz or greater.

9. The method of claim 1 wherein the heterodyne modulated optical signal is produced by generating a first optical signal with a first optical signal characterized by a first optical frequency using a first laser;

generating a second optical signal with a second optical signal characterized by a second optical frequency using a second laser; and generating a third optical signal with a third optical signal characterized by a third optical frequency using a third laser.

10. The method of claim 9, further comprising:

combining the first, second and third optical signals wherein a superposition of the first and second signals produces the first beat note wherein a superposition of the second and third signals produces the second beat note, wherein a superposition of the first and third signals produces the third beat note.

11. The method of claim 1 wherein the heterodyne modulated optical signal that is coupled to the DUT contains components corresponding to the first, second and third beat notes.

12. The method of claim 11 wherein the output of the DUT includes a component corresponding to the first beat note.

13. The method of claim 12 wherein the DUT has a known effect on the component corresponding to the first beat note.

14. The method of claim 13, further comprising using the component corresponding to the first beat note as the reference signal.

15. The method of claim 12, further comprising filtering the output signal of the DUT to reduce the component corresponding to the first beat note.

16. The method of claim 1 wherein producing the reference signal inculdes:

combining at least a portion of the first signal with at least a portion of the second signal such that their superposition produces a reference signal modulated at the frequency of the first beat note.

17. The method of claim 16 further comprising converting the superposition to an electrical signal.

18. The method of claim 17 wherein the portions of the first and second signals that are combined have substantially parallel polarizations.

19. The method of claim 1 wherein producing the heterodyne modulated optical signal includes:

generating the first signal characterized by the first frequency and a first polarization;

generating the second signal characterized by the second frequency and a second polarization that is substantially orthogonal to the first polarization;

generating the third signal characterized by the third frequency and a third polarization;

combining at least a portion of the first signal with at least a portion of the second signal to produce a combined output;

combining at least a portion of the combined output with at least a portion of the third signal to produce the heterodyne modulated output, wherein the heterodyne modulated output includes modulation at the frequencies of the second and third beat notes.

20. The method of claim 19 wherein the third polarization has a projection onto both the first and second polarizations.

21. The method of claim 20 wherein the third polarization is substantially at 45° with respect to both the first and second polarizations.

22. The method of claim 20 wherein the third polarization is a circular polarization.

23. The method of claim 19 wherein the combination of at least a portion of the combined output with at least a portion of the third signal produces a second output, wherein the second output includes at least portions of the first and second signals.

24. The method of claim 23, further comprising passing the second output through a polarizer to produce the reference signal.

25. The method of claim 19, further comprising:

splitting off a portion of the first signal;

splitting off a portion of the second signal;

manipulating the polarizations of the first and second portions such that they are substantially parallel to each other; and combining the portions that were split off of the first and second signals to produce the reference signal.

26. The method of claim 1 wherein measuring a phase difference between the mixed output signal and the reference signal includes mixing the reference signal and the mixed output in a low-speed mixer.

27. The method of claim 1 wherein the reference signal is an optical reference signal.

28. The method of claim 27 wherein measuring a phase difference between the mixed output signal and the reference signal includes modulating the output of the reference optical signal with the mixed output signal to produce a mixed optical output.

29. The method of claim 28 wherein measuring a phase difference between the mixed output signal and the reference signal further includes converting the mixed optical output to a corresponding electrical output.

30. The method of claim 1 wherein measuring a phase difference between the mixed output signal and the reference signal includes:
measuring a sample of the mixed output signal;
measuring a sample of the reference signal; and
performing digital signal processing on the samples of the mixed output and reference signals.

31. An apparatus for measuring the phase response of a device under test (DUT), comprising:
first, second and third lasers;
a combiner optically coupled at one or more inputs to the first second and third lasers, wherein an output of the combiner may be optically coupled to an input of the DUT;
a high-speed mixer that may be coupled to an output of the DUT;
a reference signal generator;
a phase measuring device coupled to the reference signal generator and a output of the high-speed mixer and
means for controlling the first second and third lasers such that
the first laser produces a first signal characterized by a first frequency,
the second laser produces a second signal characterized by a second frequency,
the third laser produces a third signal characterized by a third frequency,
wherein
a difference between the frequencies of the first and second signals corresponds to a first beat note,
a difference between the frequencies of the second and third signals corresponds to a second beat note,
a difference between the frequencies of the first and third signals corresponds to a third beat note
wherein the first beat note is characterized by a frequency that is sufficiently low that it may be processed with low-speed electronics.

32. The apparatus of claim 31 wherein the reference signal generator is configured to produce a reference signal having the same frequency as the first beat note and a known phase relative to the first beat note.

33. The apparatus of claim 31 wherein the combiner includes an orthogonal coupler optically coupled to the first and second lasers and an optical couple that is coupled to the third laser and an output of the orthogonal coupler.

34. The apparatus of claim 31 wherein the combiner includes
a first partial splitter that is optically coupled to the first laser,
a second partial splitter optically coupled to the second laser,
an orthogonal coupler optically coupled to the first and second partial splitters,
a first optical coupler optically coupled to the third laser and the orthogonal coupler, and
a second optical coupler optically coupled to the first and second partial splitters.

35. The apparatus of claim 31 wherein the combiner includes a first optical coupler optically coupled the first laser and the second laser; and
a second optical coupler optically coupled to the first optical coupler and the third laser.

36. The apparatus of claim 31 wherein the first second and third lasers are configured such that the first signal is polarized substantially orthogonal to the second signal and the third signal is polarized substantially at 45° with respect to the polarizations of the first and second signals.

37. The apparatus of claim 31, wherein the phase measuring device includes a low-speed mixer.

38. The apparatus of claim 31 wherein the phase measuring device includes an electrical to optical (EO) modulator coupled to an optical power detector.

39. The apparatus of claim 31, further comprising an integrator coupled to an output of the phase measuring device.

40. An apparatus for measuring the phase response of a device under test (DUT), comprising:
a heterodyne source configured to produce a heterodyne modulated optical signal characterized by two or more different beat notes,
wherein the heterodyne source may be optically coupled to an input of the DUT;
a high-speed mixer that may be coupled to an output of the DUT;
a reference signal generator; and
a phase detector coupled to the reference signal generator and an output of the high-speed mixer.

41. The apparatus of claim 40 wherein the heterodyne source includes first, and second lasers.

42. The apparatus of claim 41 wherein the heterodyne source includes means for modulating an output of at least one of the first and second lasers at a first beat note frequency.

43. The apparatus of claim 42 wherein the means for modulating includes an optical modulator.

44. The apparatus of claim 43 wherein the means for modulating further includes a signal generator coupled to the optical modulator.

45. The apparatus of claim 42 wherein the means for modulating includes a signal generator coupled to means for controlling an amplitude of an optical signal from one of the first and second lasers.

46. A method for measuring a phase response of a device under test (DUT) with respect to a modulated optical signal, comprising:
producing a heterodyne modulated optical signal including modulation at least at first and second beat notes, wherein a frequency difference between the first and second beat notes corresponds to an additional beat note;
coupling at least a portion of the heterodyne modulated optical signal to the DUT;
wherein the portion of the heterodyne modulated optical signal that is coupled to the DUT includes modulation at least at the frequencies of the first and second beat notes;
producing an output signal with the DUT;
wherein the output signal includes at least first and second components having frequencies respectively corresponding to the frequencies of the first and second beat notes;
mixing the first and second components to produce a mixed output signal;

producing a reference signal having the same frequency as and a known phase with respect to the additional beat note; and measuring a phase difference between the mixed output signal and the reference signal.

47. An apparatus for a phase response of a device under test (DUT) with respect to a modulated optical signal, comprising:

means for producing a heterodyne modulated optical signal including modulation at least at first and second beat notes, wherein a frequency difference between the first and second beat notes corresponds to an additional beat note;

means for coupling at least a portion of the heterodyne modulated optical signal to the DUT;

wherein the portion of the heterodyne modulated optical signal that is coupled to the DUT includes modulation at least at the frequencies of the first and second beat notes;

means for mixing first and second components of an output signal from the DUT to produce a mixed output signal, wherein the first and second components have frequencies respectively corresponding to the frequencies of the first and second beat notes;

means for producing a reference signal having the same frequency as and a known phase with respect to the additional beat note; and means for measuring a phase difference between the mixed output signal and the reference signal.

* * * * *